April 7, 1959 — S. S. BROWN — 2,880,755
PNEUMATIC ACTUATOR
Filed July 9, 1957

INVENTOR.
STEPHEN S. BROWN,
BY
ATTORNEY.

United States Patent Office 2,880,755
Patented Apr. 7, 1959

2,880,755
PNEUMATIC ACTUATOR

Stephen S. Brown, La Porte, Tex., assignor, by mesne assignments, to Jersey Production Research Company, Tulsa, Okla., a corporation of Delaware Application July 9, 1957, Serial No. 670,674

6 Claims. (Cl. 137—620)

This invention concerns a self-returning pneumatic actuator adaptable for use in fluid pressure control systems.

Briefly, the invention comprises a first housing formed to provide openings for the transmission of fluid flow through said first housing, a second housing connected to said first housing on one side of said openings, a third housing connected to said first housing on the other side of the openings, a valve plunger positioned in the first housing and extending into the second and third housings, said plunger having first and second positions and being adapted to control fluid flow through the openings in said first housing, each of said second and third housings being formed to provide a fluid inlet and outlet opening, an exhaust opening, and a fluid pressure equalizer means, conduits fluidly communicating each of said inlet and outlet openings with each of said exhaust openings, means arranged in each of said conduits adapted to prevent fluid flow from said outlet and inlet openings to said exhaust openings, pistons arranged in each of said second and third housings, each piston having first and second positions and adapted to engagedly connect with said plunger, each of said pistons being formed to provide an opening therethrough, biasing means arranged in each of said second and third housings adapted to bias said pistons to said first positions, and sealing means arranged on each end of said plunger adapted to seal off said piston openings when said pistons and plunger are engaged.

Referring to the drawings briefly:

Figure 1:
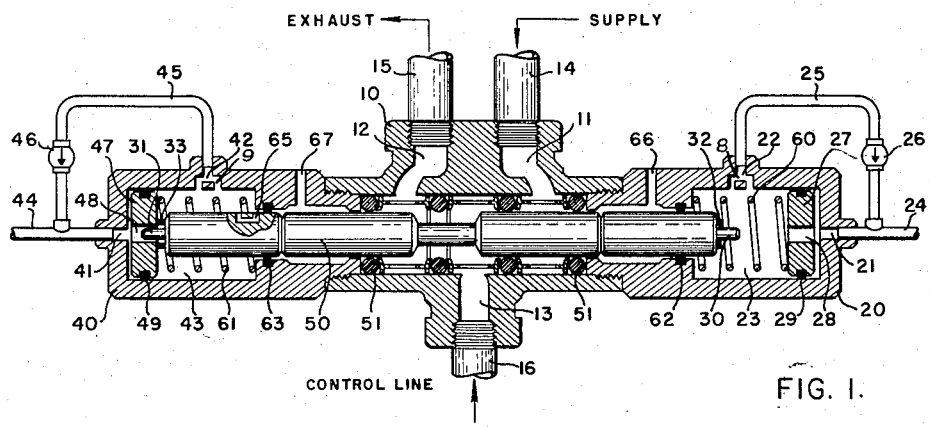
Fig. 1 is a view, partly in section, showing the actuator in one position.
Figure 2:
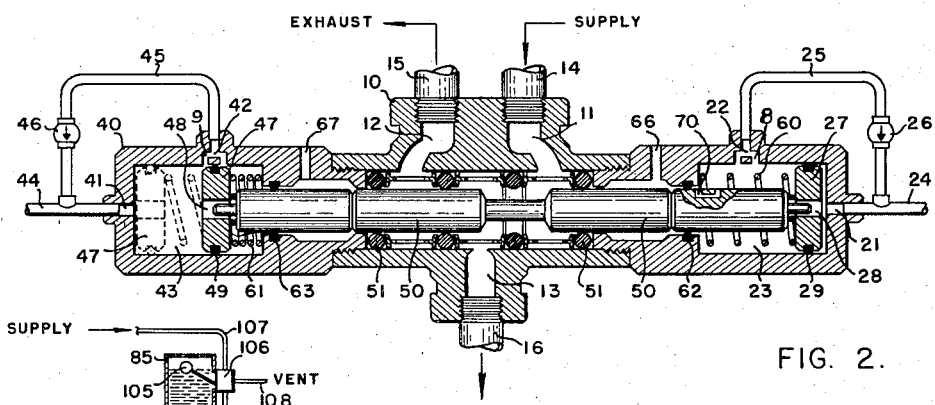
Fig. 2 is a view, partly in section, showing the actuator in another position.

Referring more particularly to the drawings:

Figs. 1 and 2 show a housing 10 formed to provide openings 11, 12, and 13. A supply conduit 14 is connected to opening 11; an exhaust conduit 15 is connected to opening 12; and a control conduit 16 is connected to opening 13. A housing 20 is connected to one end of housing 10 and is formed to provide a fluid inlet and outlet opening 21 and equalizer channel 8 and an opening 22. These openings fluidly communicate with a chamber 23 enclosed by housing 20. A conduit 24 is connected to opening 21 and a conduit 25 interconnects opening 22 and conduit 24. A check valve 26 is arranged in conduit 25 and is adapted to prevent fluid flow from conduit 24 to opening 22 and to permit fluid flow from opening 22 to conduit 24. A piston 27 is arranged in chamber 23 and is formed to provide an opening 28 therethrough. An O-ring seal 29 provided on piston 27 sealingly engages with the interior wall of housing 20.

The other end of housing 10 has connected thereto a housing 40 identical in all respects to housing 20. Thus, the openings 41 and 42 are similar to openings 21 and 22; conduit 44, similar to conduit 24, is connected to opening 41 and a conduit 45, similar to conduit 25, interconnects opening 42 and conduit 44; a check valve 46, similar to the valve 26 arranged in conduit 25, is arranged in conduit 45; a channel 9 is similar to channel 8; and a piston 47 having an opening 48 therethrough and provided with an O-ring seal 49 is arranged in chamber 43 similar to the arrangement of piston 27, opening 28, and seal 29.

A valve plunger 50 is arranged in housing 10 and extends into housings 20 and 40. Plunger 50 in cooperation with the various O-ring seals, designated 51, is adapted to control fluid flow through conduits 14, 15, and 16. Thus, as seen in Fig. 1 with valve plunger 50 in the left-hand position, conduits 16 and 15 are in fluid communication and fluid flow through conduits 14 and 16 is sealed off. As viewed in Fig. 2 with valve plunger 50 in the right-hand position, fluid flow through conduits 15 and 16 is sealed off and conduits 14 and 16 are in fluid communication. Each end of plunger 50 is provided with extensions 30 and 31, respectively, which extensions are adapted to extend into openings 28 and 48, respectively, in pistons 27 and 47, respectively. Adjacent extensions 30 and 31 are positioned seals 32 and 33, respectively, which seals are adapted to engage with pistons 27 and 47, respectively, to seal off openings 28 and 48, respectively.

Springs 60 and 61 are provided in chambers 23 and 43, respectively, and are adapted to bias the piston members 27 and 47, respectively, in the directions of inlet and outlet openings 21 and 41, respectively. Also the interiors of housings 20 and 40 are provided with O-ring seals 62 and 63, respectively, which seals are adapted to seal off fluid flow from chambers 23 and 43, respectively.

Each end of valve plunger 50 is provided with by-pass openings indicated at 65 (Fig. 1) and 70 (Fig. 2). Housings 20 and 40 are provided also with bleed or exhaust openings 66 and 67, respectively. The purpose of openings 66 and 67 is to bleed chambers 23 and 43, respectively, when plunger 50 moves to predetermined right-hand and left-hand positions wherein by-passes 65 and 70 fluidly communicate chamber 23 and opening 66 and chamber 43 and opening 67, respectively.

Although seals 29, 49, 62, 63 and 51 are shown and described herein as O-ring seals, any suitable type sealing means may be employed instead.

The positions of the plunger 50 and pistons 27 and 47, as seen in Fig. 1, resulted from fluid pressure transmitted through conduit 24 and the exhaust of conduit 44 which caused piston 27 and plunger 50 to be moved to the left. As plunger 50 began movement to the left, by-pass 70, shown in Fig. 2, exhausted any fluid pressure on the left side of piston 27 in chamber 23 through opening 66 in housing 20. When piston 27 reached equalizer channel 8, the fluid pressure in chamber 23 on each side of piston 27 became equalized by means of channel 8. Then, under the bias of spring 60, piston 27 returned to its initial right-hand position, as shown. This action occurred even though fluid pressure was maintained in conduit 24 because when piston 27 started to move under the bias of spring 60 the sealing engagement between seal 32 and piston 27 was broken and although piston 27 moved away from channel 8, which prevented equalization of fluid pressure through channel 8, opening 28 equalized fluid pressure on each side of piston 27.

Although the fluid pressure in conduit 24 is maintained, piston 27 remains in the right-hand position because of equalizer opening 28.

As seen in Fig. 2, plunger 50 and piston 47 are in the right-hand position. This position resulted from fluid pressure transmitted through conduit 44. Movement of plunger 50 and piston 47 to the right-hand position occurred even though fluid pressure was maintained in conduit 24 because the full cross-sectional area of piston 47 is greater than the cross-sectional area of the right-hand end of plunger 50 which extends into chamber 23 which latter area is the area against which the fluid pressure acts when piston 27 is disengaged from plunger 50.

As plunger 50 began movement to the right, by-pass 65, shown in Fig. 1, exhausted any fluid pressure in chamber 43 through opening 67 in housing 40. The by-passes 65 and 70 prevent pressure locks in chambers 43 and 23, respectively.

As seen in Fig. 2, when piston 47 reaches equalizer channel 9, fluid pressure on each side of piston 47 is equalized by means of channel 9; and piston 47 is moved to its initial left-hand position, as seen in dotted lines, under the bias of the spring 61.

When seal 32 on the right-hand end of the plunger 50 engages with piston 27, plunger 50 will be moved to the left-hand position if fluid pressure is maintained in conduit 24.

Conduits 24 and 45 and check valves 26 and 46 function in the following manner:

After channel 9 equalizes pressure on each side of piston 47 and piston 47 has been returned to its initial position under the bias of spring 61, as seen in dotted lines in Fig. 2, fluid pressure exists in chamber 43 because fluid pressure in conduit 44 fluidly communicates with chamber 43 through openings 41 and 48. When in the subsequent operation piston 27 returns plunger 50 to the left-hand position, as seen in Fig. 1, fluid pressure in chamber 43 is entrapped therein; however, movement of plunger 50 causes conduit 44 to exhaust and the fluid pressure in chamber 43 exhausts through conduit 45 and check valve 46 into conduit 44. Exhaust of fluid pressure from chamber 43 is necessary in order to permit the subsequent pressure signal through conduit 44 to move piston 47 and connected plunger 50 to the right-hand position, as seen in Fig. 2. A similar action occurs with respect to chamber 23. Thus fluid pressure in chamber 23 exhausts through conduit 25 and check valve 26 when fluid pressure in conduit 24 exhausts, thus permitting the subsequent fluid pressure signal to move piston 27 and connected plunger 50 to the left.

To obtain a clearer understanding of the operation of the invention a description of the operation of the actuator in conjunction with a metering device will now be set forth.

Figure 3:
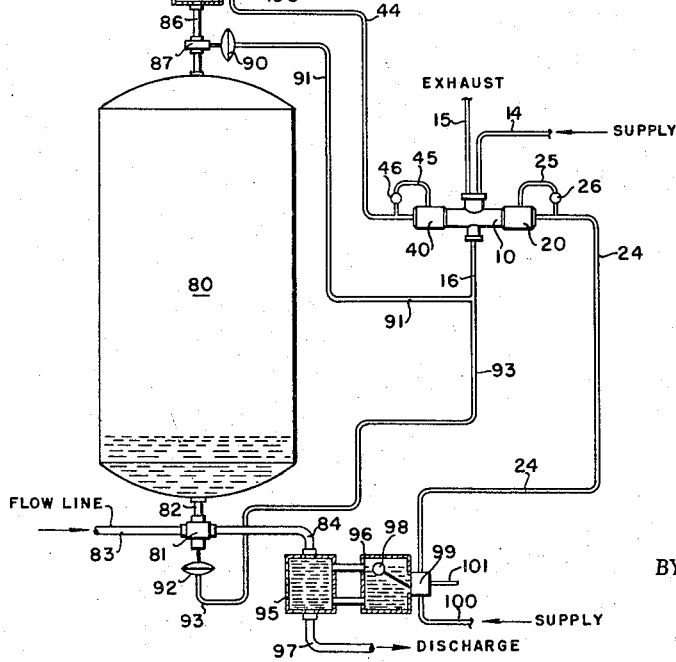
Fig. 3 is a schematic illustration showing the actuator positioned in the control system of an automatic metering device.

In Fig. 3 is shown a metering device similar to the metering device disclosed in U.S. patent application Serial No. 586,964, filed May 24, 1956, by William A. Pitts, entitled "Positive Volume Fuid Meter."

As shown in Fig. 3, a metering vessel 80 is provided with a fluid inlet and outlet valve 81 connected to conduit 82, inlet conduit 83 and outlet conduit 84. Arranged above vessel 80 is a chamber 85 which fluidly communicates with vessel 80 by means of a conduit 86 in which is arranged to valve 87. Valves 81 and 87 are spring-biased diaphragm type valves wherein the valve is moved to one position under the action of a fluid pressure signal and is moved to another position under the bias of a spring upon the exhaust of the fluid pressure signal. Thus, associated with a valve 87 is a diaphragm 90 to which is connected a conduit 91. Similarly, valve 81 has associated therewith a diaphragm 92 to which is connected a conduit 93. Upon application of a fluid pressure signal to diaphragm 90 via conduit 91, valve 87 closes thereby preventing fluid communication between metering vessel 80 and chamber 85 via conduit 86. Valve 81 fluidly communicates conduits 82 and 84 and closes off fluid communication between conduits 82 and 83 upon application of a fluid pressure signal to diaphragm 92 via conduit 93. Valve 87 opens to permit fluid communication between metering vessel 80 and chamber 85 when fluid pressure is exhausted from diaphragm 90 through conduit 91. Valve 81 fluidly communicates conduits 82 and 83 and closes off fluid communication between conduits 82 and 84 when fluid pressure is exhausted through conduit 93.

Discharge conduit 84 connects to control chambers 95 and 96, respectively, which chambers discharge through conduit 97. Chamber 96 is provided with a float 98 which is connected to valve 99. Connected to valve 99 are a fluid pressure supply conduit 100, an exhaust or vent conduit 101, and conduit 24. When float 98, in response to the level of liquid in chamber 96 is in the "up" position, conduit 24 exhausts through exhaust conduit 101. However, when float 98 is in the "down" position, a source of fluid pressure is supplied to conduit 24 through conduit 100.

Chamber 85 is provided with a float 105 which is connected to a valve 106. Connected to valve 106 are a fluid pressure supply conduit 107, an exhaust or vent conduit 108 and conduit 44. When responsive to the level of liquid in chamber 85, float 105 moves to the "up" position, fluid pressure is supplied through conduit 107 to conduit 44. In the "down" position of float 105, conduit 44 exhausts through vent 108.

To facilitate a clear understanding of the operation of the actuator of Figs. 1 and 2, the same conduit designations have been made in Figs. 3 as were made in Figs. 1 and 2. Thus, conduits 91 and 93 connect to conduit 16. The supply conduit is designated 14, and the exhaust conduit is designated 15 and the by-pass conduits are designated 25 and 45.

In the device of Fig. 3, it is assumed that vessel 80 is in the process of discharging. In this position valve plunger 50 is in the right-hand position as seen in Fig. 2. Thus, a fluid pressure signal from the supply source is transmitted through conduit 14 to conduit 16 and thence to conduits 91 and 93 and their respective diaphragms 90 and 92 in order to maintain valve 87 closed and valve 81 in the discharge position. In the right-hand Fig. 2 position of valve plunger 50, fluid communication between conduits 15 and 16 is closed off.

Upon complete discharge of metering vessel 80, the liquid level in chamber 96 drops and float 98 moves to the "down" position. In the "down" position fluid pressure is supplied through conduit 100 to conduit 24 and thence into the right-hand side of the actuator. This fluid pressure signal through conduit 24 enters chamber 23 and moves piston 27 and plunger 50 to the left-hand position. Movement of plunger 50 to the left closes off fluid communication between supply conduit 14 and conduit 16 and exhausts conduit 16 through conduit 15. Exhaust of conduit 16 exhausts conduits 91 and 93 thereby reversing valves 87 and 81. Thus, valve 87 opens and valve 81 moves to the fill position wherein conduits 83 and 82 are in fluid communication. The liquid in chamber 85 discharges into vessel 80 via open valve 87 and conduit 86 and float 105 moves to the "down" position. In the "down" position conduit 44 exhausts through vent 108.

Referring, again, to Figs. 1 and 2, upon movement of valve plunger 50 to the left, piston 27, upon reaching the equalizing channel 8, was moved to the right-hand position under the bias of spring 60. Therefore, piston 27 assumes its initial position; however, valve plunger 50 remains in its new left-hand position. Exhaust of conduit 44 has no effect upon the movement of valve plunger 50.

When vessel 80 has filled completely liquid passes through open valve 87 and conduit 86 into chamber 85 thereby moving float 105 to the "up" position. Upon movement of float 105 to the "up" position, a fluid pressure signal is supplied through conduit 107 to conduit 44. Since valve plunger 50 is in the position as shown in Fig. 1, the fluid pressure signal passes through conduit 44 into chamber 43 thereby moving piston 47 and connected valve plunger 50 to the right-hand position. Movement to the right-hand position is effected even though a fluid pressure signal is being supplied simultaneously to chamber 23 via conduit 24 (since float 98 is in the "down" position in which position a fluid pressure signal is supplied to conduit 24 via supply conduit 100). Thus, again, the valves are reversed since valve plunger 50 assumes the right-hand position of Fig. 2 wherein supply conduit 14 fluidly communicates with conduit 16 and closes off fluid communication between exhaust conduit 15 and conduit 16. Application of fluid pressure to conduit 16 transmits fluid pressure to conduits 91 and 93, and thence to diaphragms 90 and 92, respectively, which, in turn, closes valve 87 and at the same time fluidly communicates conduits 82 and 84 and closes off fluid communication between conduits 82 and 83. Thus, metering vessel 80 begins the discharge cycle. The entire operation is then repeated.

The actuator of Figs. 1 and 2 is adaptable for use with various fluid pressure control or other systems and the invention is not to be construed as limited to its use in the specific metering arrangement of Fig. 3.

Having fully described the elements, nature, operation, and objects of my invention, I claim:

1. A pneumatic actuator comprising a first housing formed to provide openings for the transmission of fluid flow through said first housing, a second housing connected to said first housing on one side of said openings, a third housing connected to said first housing on the other side of said openings, a valve plunger positioned in said first housing and extending into said second and third housings and having first and second positions adapted to control fluid flow through said first housing, the portions of said plunger extending into said second and third housings having by-passes formed thereon, each of said second and third housings being formed to provide a fluid inlet and outlet opening, an equalizer channel, and first and second exhaust openings, separate conduits connecting each of said inlet and outlet openings to each of said first exhaust openings, check valves arranged in each of said conduits adapted to prevent fluid flow from said inlet and outlet openings to said first exhaust openings, pistons arranged in each of said first and second chambers, each piston having first and second positions and adapted to engagedly connect with said plunger, said pistons being formed to provide openings therethrough, biasing means arranged in each of said first and second chambers adapted to bias said pistons to said first positions, first sealing means arranged on said plunger adapted to seal off said piston openings when said pistons and plunger are engaged, second sealing means arranged in each of second and third housings adapted to seal off fluid flow from each of said first and second chambers to said second exhaust openings, said by-passes being adapted to exhaust said first and second chambers via said second exhaust openings when said pistons are in selected positions.

2. A pneumatic actuator comprising a first housing formed to provide openings for the transmission of fluid flow through said first housing enclosing a first chamber, a second housing connected to said first housing on one side of said openings, a third housing enclosing a second chamber connected to said first housing on the other side of said openings, a valve plunger positioned in the first housing and extending into said first and second chambers, said plunger having first and second positions and being adapted to control fluid flow through the openings in said first housing, each of said second and third housings being formed to provide a fluid inlet and outlet opening and an equalizer channel, conduits exterior of said housings connecting each of said inlet and outlet openings and said first and second chambers, check valves arranged in each of said conduits adapted to prevent fluid flow from said inlet and outlet openings to said first and second chambers, pistons arranged in each of said first and second chambers, each piston having first and second positions and adapted to engagedly connect with said plunger, each of said pistons being formed to provide an opening therethrough, biasing means arranged in each of said first and second chambers adapted to bias said pistons to said first positions and sealing means arranged on each end of said plunger adapted to seal off said piston openings when said pistons and plunger are engaged.

3. An apparatus for use in a fluid control system comprising a housing enclosing a chamber, a valve plunger extending into said chamber adapted to control transmission of fluid flow, said plunger being formed to provide a by-pass, said housing being formed to provide a fluid inlet and outlet opening, first and second exhaust openings and an equalizer channel, a conduit exterior of said housing connecting said inlet and outlet opening and said first exhaust opening, a check valve arranged in said conduit adapted to prevent fluid flow from said inlet and outlet opening to said first exhaust opening, a piston arranged in said chamber having first and second positions adapted to engagedly connect with said plunger, said piston being formed to provide an opening therethrough, biasing means arranged in said chamber adapted to bias said piston to said first position, first sealing means arranged on said plunger adapted to seal off said piston opening when said piston and plunger are engaged and second sealing means arranged in said housing adapted to seal off fluid flow from said chamber to said second exhaust opening, said by-pass opening being adapted to exhaust said chamber via said second exhaust opening when said piston is in a selected position.

4. Apparatus for use in a fluid flow control system comprising a housing enclosing a chamber, a valve plunger extending into said chamber adapted to control the transmission of fluid flow, said plunger having first and second positions, said housing being formed to provide a fluid inlet and outlet opening and an equalizer channel, a conduit interconnecting said inlet and outlet opening and said chamber exterior of said housig, a check valve arranged in said conduit adapted to prevent fluid flow from said inlet and outlet opening to said chamber, a piston arranged in said housing having first and second positions adapted to engagedly connect with said plunger, said piston being formed to provide an opening therethrough, biasing means arranged in said housing adapted to bias said piston to said first position and sealing means arranged on said plunger adapted to seal off said piston opening when said piston and plunger are engaged.

5. A pneumatic actuator comprising a first housing enclosing a first chamber, a second housing enclosing a second chamber, means connected between said first and second housings and including a valve plunger extending into said first and second chambers, the portions of said plunger extending into said first and second chambers having by-passes formed thereon, a piston arranged in each of said first and second chambers, each piston having first and second positions and adapted to engagedly connect with said plunger, said pistons being formed to provide openings therethrough, biasing means arranged in each of said first and second chambers adapted to bias said pistons to said first positions, each of said first and second housings being formed to provide a fluid inlet and outlet opening, first and second exhaust openings, and an equalizer means, said equalizer means being adapted to equalize fluid pressure on each side of said pistons, conduits exterior of said first and second housings connecting each of said inlet and outlet openings to each of said first exhaust openings, means arranged in each conduit adapted to prevent fluid flow from each of said inlet and outlet openings to each of said first exhaust openings, first sealing means adapted to seal off said piston openings when said pistons and plunger are engaged and second sealing means arranged in each of said first and second housings adapted to seal off fluid flow from said first and second chambers to said second exhaust openings, said by-passes being adapted to exhaust said first and second chambers via said second exhaust openings when said pistons are in selected positions.

6. A pneumatic actuator comprising first and second spaced apart housings, means positioned between said first and second housings including a valve plunger, said plunger extending into said first and second housings and having first and second positions, a piston arranged in each of said first and second housings, each piston having first and second positions and adapted to engagedly connect with said plunger, said pistons being formed to provide openings therethrough, biasing means arranged in each of said first and second housings adapted to bias said pistons to said first positions, sealing means adapted to seal off said piston openings when said pistons and plunger are engaged, each of said first and second housings being formed to provide a fluid inlet and outlet opening, an exhaust opening, and an equalizer means, said equalizer means being adapted to equalize fluid pressure on each side of said pistons, conduits connecting each of said inlet and outlet openings and said exhaust openings, and means arranged in each of said conduits adapted to prevent fluid flow from each of said inlet and outlet openings to each of said exhaust openings.

References Cited in the file of this patent

UNITED STATES PATENTS

| | | |
|---|---|---|
| 2,369,505 | Ward | Feb. 13, 1945 |
| 2,601,990 | Holzer | July 1, 1952 |
| 2,614,539 | Ernst | Oct. 21, 1952 |